United States Patent Office 2,706,581
Patented Apr. 19, 1955

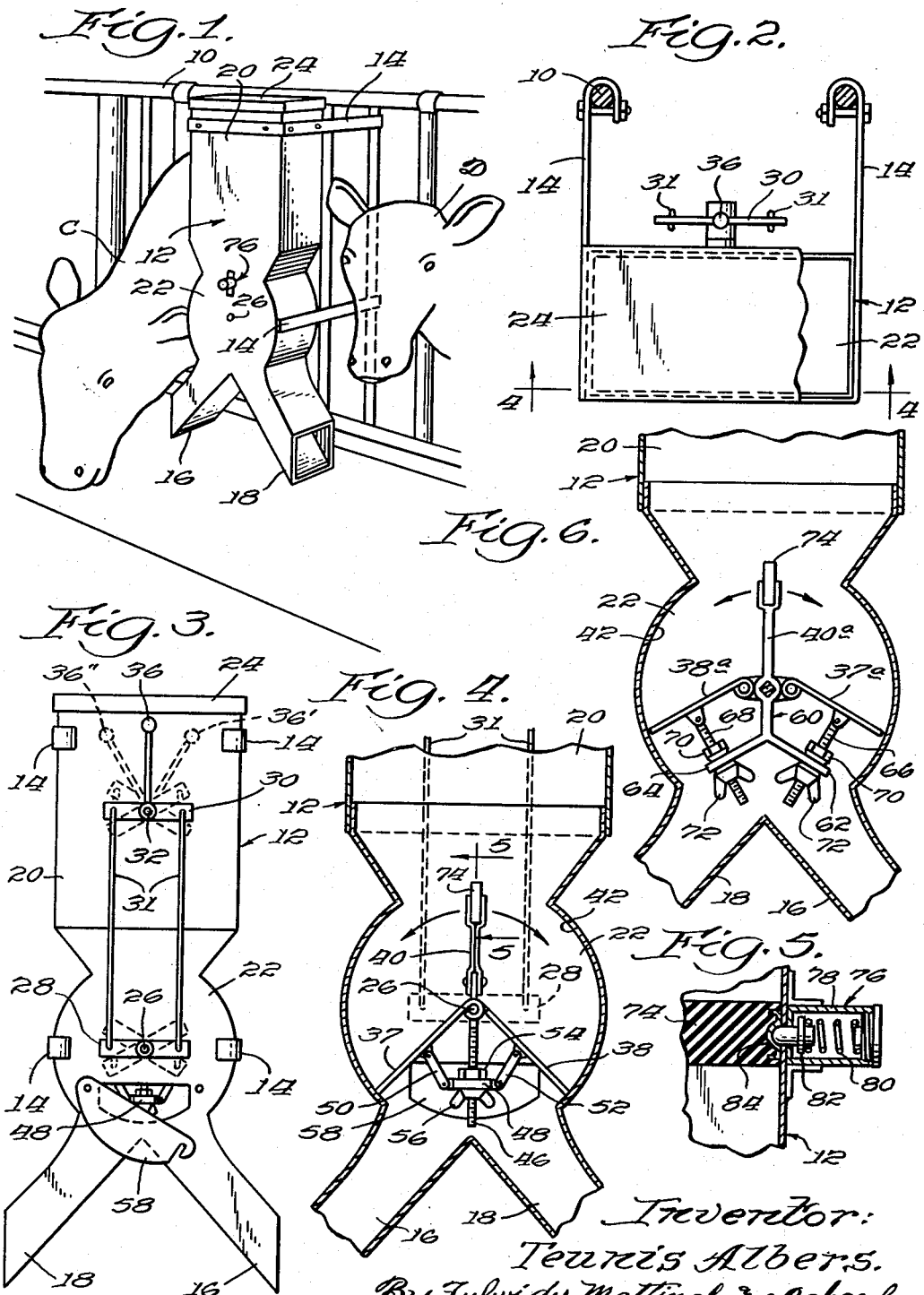

2,706,581

ANIMAL FEEDING APPARATUS

Teunis Albers, Artesia, Calif.

Application December 5, 1952, Serial No. 324,353

8 Claims. (Cl. 222—181)

The present invention relates generally to the field of dairying, and more particularly to an improved apparatus for supplying cows with feed.

It is well known that a cow will more freely release her milk if she is feeding during the milking process. Heretofore, however, suitable apparatus for feeding a cow during the milking process has not been provided. Generally, a single milker is required to milk and feed eight to ten cows at a single time, and the heretofore proposed feeding apparatus have generally required that the milker interrupt his milking duties in order to add to the cow's supply of feed. Alternately, if the milker provides each of the cows he is to milk with sufficient feed to last throughout the time required for him to milk all of the eight to ten cows, the first cows milked will still be feeding when the milking operation has been completed. The cows milked last, however, will have eaten all of their feed before the milker has reached them for milking. In both cases a loss of feed occurs. This problem is complicated further by the fact that the health regulations of the various States generally require feed to be kept outside of the building wherein the milking takes place. Accordingly, the milker must make several trips between the milking area and the point at which the feed is stored, thereby prolonging the milking period.

A major object of the present invention is to provide a cow feeding apparatus which may be filled with feed before the milking operation starts, and will thereafter keep all of the cows supplied with just the amount of feed required during the milking operation.

Another object of the present invention is to provide a cow feeding apparatus which will deposit feed directly before the cow whereby she will not have to reach for it and thereby make the milker's job more difficult.

A further object of the present invention is to provide cow feeding apparatus which will not deposit feed upon the cow's face as is true with the many heretofore proposed cow feeding devices.

It is another objection of the present invention to provide cow feeding apparatus which will always deliver an exact amount of feed to the cow, which exact amount may be readily adjusted.

Yet a further object of the present invention is to provide a cow feeding apparatus which is simple of construction whereby it may be inexpensive to manufacture, will not require expensive maintenance, and will be foolproof in operation.

Another object of the present invention is to provide a cow feeding apparatus which is adaptable for use for all types of feed.

An additional object of the present invention is to provide a cow feeding apparatus which will not require extensive cleaning after every milking period.

Other objects and advantages of the present invention will become apparent from the following detailed description of two preferred embodiments thereof, taken in conjunction with the appended drawings wherein:

Figure 1 is a general perspective view of a cow feeding apparatus embodying the present invention;

Figure 2 is a top plan view of the apparatus shown in Figure 1;

Figure 3 is a rear elevational view of said apparatus;

Figure 4 is a fragmentary vertical sectional view taken along line 4—4 of Figure 2;

Figure 5 is an enlarged fragmentary vertical sectional view taken along line 5—5 of Figure 4; and, Figure 6 is a fragmentary vertical sectional view showing a modification of the cow feeding apparatus of Figures 1 through 5.

Referring to the drawings, and particularly to Figure 1 thereof, the preferred form of animal feeding apparatus embodying the present invention is adapted to be mounted between a pair of cows C and D, which cows are disposed within a milking stall having stanchions 10. The apparatus includes a housing, generally designated 12, which is adapted to be secured to the stanchions 10 as by brackets 14. A pair of chutes 16 and 18 are designed to deliver feed directly in front of the cows C and D respectively at the will of the milker (not shown).

Referring now to Figures 2, 3 and 4, the housing 12 defines a storage compartment 20 at its upper portion for feed, and a measuring chamber 22 below the storage compartment and in communication therewith. The measuring chamber 22 is in turn in communication with the top of the chutes 16 and 18. Novel means to be fully described hereinafter are contained within the measuring chamber 22 and are adapted to release feed in a predetermined amount through each of the chutes 16 and 18.

More particularly, the housing 12 includes a cover 24 which is removable whereby feed may be disposed within the storage compartment 20. The metering chamber 22 is seen to be of a generally cylindrical configuration and rotatably mounts a horizontal shaft 26, which shaft is coaxial with the chamber 22. The portion of this shaft 26 extending from the rear of the metering chamber rigidly is shown as mounting a cross piece 28. This cross piece is connected at its opposite ends to a similar cross piece 30, as by means of rods or wires 31. The upper cross piece 30 is rotatably secured to a stub shaft 32, which shaft is in turn rotatably mounted by the rear wall of the storage compartment 20. The mid-portion of the upper cross piece 32 is rigidly secured to a control handle 36 and it will be apparent that pivotal movement of this control handle about axis of the shaft 32 will effect concurrent rotation of the shaft and hence of the two cross pieces 30 and 26. In this manner movement of the control handle 36 will likewise effect rotation of the shaft 26.

With particular reference to Figure 4, the shaft 26 is seen to mount the inner end of a pair of downwardly inclined radially extending admission plates 37 and 38. These admission plates normally block the entrance to the chutes 16 and 18. The shaft 26 is also seen to rigidly mount a radially extending upstanding divider plate 40, which divider plate normally permits communication between the chamber 22 and the storage compartment 20. Accordingly, it will be observed that pivotal movement of the control handle 36 will effect concurrent rotation of the two admission plates 37 and 38, respectively, and the divider plate 40.

In the operation of the present apparatus, the milker before starting the milking operation will fill the storage compartment 20 with at least a sufficient amount of feed to feed two cows during the time required to milk them. This is accomplished by removing the cover 24, depositing the desired quantity of food within the storage compartment 20, and then replacing the cover. Thereafter, the feed cart may be removed from the milking barn. Next, assuming that cow C is to be milked first, the milker will urge the control handle 36 to the right, referring to Figure 3, to the dotted line position designated 36'. This action will cause shaft 26, both admission plates 37 and 38 and the divider plate 40 to be concurrently rotated in a clockwise direction relative to the housing 12.

Referring now to Figure 4, it should be noted that at such time as the admission plates 37 and 38 and the divider plate 40 are in their normal positions, the space in the metering chamber 22 between the upper surface of each admission plate and the sides of the divider plate will be filled with feed. When, however, the control handle 36 is urged to position 36', the free end of admission plate 37 will move downwardly so as to uncover the entrance of the chute 16. Further, the free end of the divider plate 40 will move downwardly so as to slidingly engage the side walls 42 of the metering chamber 22 and thereby block off communication between the right side of the chamber and the storage compartment. Accordingly, the feed entering the metering chamber before such communication is cut off will pass through the chute 16 into cow C's feeding trough (not shown). At the same time the other admission plate 38 will block off the flow of feed through the other chute 18. Thereafter, when cow D is to be milked, the control handle 36 may be urged to the left until it reaches the position designated 36″ in Figure 3. This action will cause a quantity of feed similar to that previously released through chute 16 to be released through chute 18.

It is very desirable that the quantity of feed released through the chutes by each movement of the control handle be adjustable to the needs of the cows being fed. The present invention contemplates such adjustment by the provision of means for adjusting the relative angular displacement between the admission plates 37 and 38 and the divider plate 40.

In the preferred form of the invention shown in Figures 1 through 5, this adjustment is made possible by the pivotal connection of the admission plates 37 and 38 to the shaft 26 whereby their angular displacement may be varied. The actual variation may be carried out by the provision on the underside of the shaft of a downwardly extending threaded post 46. This post 46 slidably mounts a collar 48 for vertical movement relative thereto. A pair of links 50 and 52, respectively, are pivotally interposed between the opposite sides of the collar 48 and the underside of the admission plates 37 and 38. Nut means in the form of a lock nut 54 and a wing nut 56 permit the vertical adjustment of the collar 48 and hence the angular adjustment of the admission plates. In order to permit access to the nuts 54 and 56 the rear of the housing may be provided with a normally closed door 58.

In the form of the invention shown in Figure 6, the means for obtaining adjustment of the relative angular inclination of the admission plates 37a and 38a incorporates an inverted Y-shaped mounting element 60 having legs 62 and 64. Preferably, this mounting element will be an integral extension of the divider plate 40a. Each of the legs 62 and 64 will be formed with a bore (not shown), which bores will slidably receive threaded posts 66 and 68 whereby axial movement of the posts relative to these bores will change the relative angular displacement between the admission plates 37a and 38a. Each of the threaded posts 66 and 68 are pivotally connected to the underside of one of the admission plates. Nut means comprising a lock nut 70 and a wing nut 72 are provided for effecting axial adjustment of the posts relative to the legs. With this arrangement each admission plate may be varied as to its inclination independently whereby a different quantity of feed may be released through each of the chutes 16 and 18.

It has also been found desirable to provide the free end of the divider plate 40 with a strip of rubber-like material 74. The provision of this strip prevents any binding between the divider plate's free end and the side walls 42 of the metering chamber 22 whenever feed of a granular character is utilized.

In order that the admission plates 37 and 38 and the divider plate 40 may be yieldingly retained in their normal position, a spring detent 76 may be interposed between the divider plate and a side wall of the housing 12. A preferred form of spring detent 76 is shown in Figure 5. This detent includes a cylinder 78 rigidly secured to the housing 12, a helical compression spring 80 disposed within the cylinder, and a plunger element 82 which is constantly biased outwardly by the spring 80. The rubber-like strip 74 is seen to mount a catch element 84 adapted to receive the inner end of the plunger element 82.

The chutes 16 and 18 should be arranged to deliver feed directly in front of the cows C and D whereby they will not be required to stretch in order to reach it. These chutes should likewise have their lower ends at a lower elevation than the heads of the cows in order that feed flowing therethrough will not contact the cows' heads. Additionally, the size of these chutes should be sufficiently small that the cows cannot force their heads thereinto when seeking feed. This arrangement eliminates considerable cleaning of the apparatus.

It should be particularly noted that although the particular embodiments of the invention herein shown and described are fully capable of providing the advantages and achieving the objects previously set forth, such embodiments are merely illustrative and various modifications and changes may be made without departing from the spirit of the invention or the scope of the appended claims.

I claim:
1. Animal feeding apparatus comprising: a storage compartment for animal feed; a generally cylindrical metering chamber below said compartment and in communication therewith, said chamber having a horizontal axis of rotation; a first chute leading from the lower portion of said chamber at one side thereof; a second chute leading from the lower portion of the opposite side of said chamber; a horizontal shaft coaxially rotatably mounted in said chamber; a first downwardly inclined radially extending admission plate connected to said shaft and having its intermediate portion normally disposed above and covering the entrance to said first chute; a second downwardly inclined radially extending admission plate connected to said shaft and having its intermediate portion normally disposed above and covering the entrance to said second chute; a radially extending divider plate connected to said shaft and normally being vertically positioned within said chamber so as to permit feed to enter said chamber from said compartment; means to adjust the angular displacement of said admission plates relative to said divider plate; and means to selectively rotate said shaft in a first direction whereby the free end of said first admission plate will move downwardly past the entrance to said first chute and the free end of said divider plate will move downwardly within said chamber so as to block off communication between one side of said chamber and said compartment in order that the feed so entering said one side of said chamber may pass through said first chute, and then in the opposite direction whereby the free end of said second admission plate will move downwardly past the entrance to said second chute and the free end of said divider plate will move downwardly within said chamber so as to block off communication between the other side of said chamber and said compartment in order that the feed so entering said other side of said chamber may pass through said second chute.

2. Animal feeding apparatus comprising: a housing; bracket means for attaching said housing within an animal stall; a storage compartment for animal feed in said housing; a removable cover for said compartment; a generally cylindrical metering chamber below said compartment in said housing and in communication therewith, said chamber having a horizontal axis of rotation; a first chute leading from the lower portion of said chamber at one side thereof; a second chute leading from the lower portion of the opposite side of said chamber; a horizontal shaft coaxially rotatably mounted in said chamber; a first downwardly inclined radially extending admission plate having one of its ends pivotally connected to said shaft and having its intermediate portion normally disposed above and covering the entrance to said first chute; a second downwardly inclined radially extending admission plate having one of its ends pivotally connected to said shaft and having its intermediate portion normally disposed above and covering the entrance to said second chute; a threaded post extending downwardly from said shaft; a collar vertically slidably mounted on said post; a pair of links pivotally interposed between the opposite sides of said collar and the underside of said admission plates so that vertical movement of said collar relative to said post will change the relative angular displacement between said admission plates; nut means threadedly carried by said post to effect vertical adjustment of said collar relative to said post; a normally closed door in said housing providing access to said nut means; a radially extending divider plate having one of its ends rigidly connected to said shaft and normally being vertically positioned within said chamber so as to permit feed to enter either side of said chamber from said compartment; spring detent means interposed between said divider plate and the walls of said chamber for yieldably retaining said divider plate in its normal position, and means to selectively rotate said shaft in a first direction whereby the free end of said first admission plate will move downwardly past the entrance to said first chute and the free end of said divider plate will move downwardly within said chamber so as to block off communication between one side of said chamber and said compartment in order that the feed so entering said one side of said chamber may pass through said first chute, and then in the opposite direction whereby the free end of said second admission plate will move downwardly past the entrance to said second chute and the free end of said divider plate will move downwardly within said chamber so as to block off communication between the other side of said chamber and said compartment in order that the feed so entering said other side of said chamber may pass through said second chute.

3. Animal feeding apparatus comprising: a housing; bracket means for attaching said housing within an animal stall; a storage compartment for animal feed in said housing; a removable cover for said compartment; a generally cylindrical metering chamber below said compartment in said housing and in communication therewith, said chamber having a horizontal axis of rotation; a first chute leading from the lower portion of said chamber at one side thereof; a second chute leading from the lower portion of the opposite side of said chamber; a horizontal shaft coaxially rotatably mounted in said chamber; a first downwardly inclined radially extending admission plate having one of its ends pivotally connected to said shaft and having its intermediate portion normally disposed above and covering the entrance to said first chute; a second downwardly inclined radially extending admission plate having one of its ends pivotally connected to said shaft and having its intermediate portion normally disposed above and covering the entrance to said second chute; a threaded post extending downwardly from said shaft; a collar vertically slidably mounted on said post; a pair of links pivotally interposed between the opposite sides of said collar and the underside of said admission plates so that vertical movement of said collar relative to said post will change the relative angular displacement between said admission plates; nut means threadedly carried by said post to effect vertical adjustment of said collar relative to said post; a normally closed door in said housing providing access to said nut means; a radially extending divider plate having one of its ends rigidly connected to said shaft and normally being vertically positioned within said chamber so as to permit feed to enter either side of said chamber from said compartment; a strip of rubber-like material secured to the free end of said divider plate for engagement with the side walls of said chamber; spring detent means interposed between said divider plate and said housing for yieldably retaining said divider plate in its normal position, and handle means on the rear of said housing connected to said shaft so as to permit said shaft to be selectively rotated in a first direction whereby the free end of said first admission plate will move downwardly past the entrance to said first chute and the free end of said divider plate will move downwardly within said chamber so as to block off communication between one side of said chamber and said compartment in order that the feed so entering said one side of said chamber may pass through said first chute, and then in the opposite direction whereby the free end of said second admission plate will move downwardly past the entrance to said second chute and the free end of said divider plate will move downwardly within said chamber so as to block off communication between the other side of said chamber and said compartment in order that the feed so entering said other side of said chamber may pass through said second chute.

4. Animal feeding apparatus comprising: a housing; bracket means for attaching said housing within an animal stall; a storage compartment for animal feed in said housing; a removable cover for said compartment; a generally cylindrical metering chamber below said compartment in said housing and in communication therewith, said chamber having a horizontal axis of rotation; a first chute leading from the lower portion of said chamber at one side thereof; a second chute leading from the lower portion of the opposite side of said chamber; a horizontal shaft coaxially rotatably mounted in said chamber and extending through the rear of said housing; a first downwardly inclined radially extending admission plate having one of its ends pivotally connected to said shaft and having its intermediate portion normally disposed above and covering the entrance to said first chute; a second downwardly inclined radially extending admission plate having one of its ends pivotally connected to said shaft and having its intermediate portion normally disposed above and covering the entrance to said second chute; an inverted V-shaped mounting element rigidly secured to and depending from said shaft, each leg of said element being formed with a bore; a pair of threaded posts each pivotally secured at one end to the underside of one of said admission plates and having its intermediate portion slidably disposed in one of said bores so that axial movement of said posts relative to said bores will change the relative angular displacement between said admission plates; nut means threadedly carried by said posts to effect axial adjustment of said posts relative to said mounting element; a radially extending divider plate having one of its ends rigidly connected to said shaft and normally being vertically positioned within said chamber so as to permit feed to enter either side of said chamber from said compartment; spring detent means interposed between said divider plate and said housing for yieldably retaining said divider plate in its normal position; and handle means on the rear of said housing connected to said shaft so as to permit said shaft to be selectively rotated in a first direction whereby the free end of said first admission plate will move downwardly past the entrance to said first chute and the free end of said divider plate will move downwardly within said chamber so as to block off communication between one side of said chamber and said compartment in order that the feed so entering said one side of said chamber may pass through said first chute, and then in the opposite direction whereby the free end of said second admission plate will move downwardly past the entrance to said second chute and the free end of said divider plate will move downwardly within said chamber so as to block off communication between the other side of said chamber and said compartment in order that the feed so entering said other side of said chamber may pass through said second chute.

5. Animal feeding apparatus comprising: a housing; bracket means for attaching said housing within an animal stall; a storage compartment for animal feed in said housing; a removable cover for said compartment; a generally cylindrical metering chamber below said compartment in said housing and in communication therewith, said chamber having a horizontal axis of rotation; a first chute leading from the lower portion of said chamber at one side thereof; a second chute leading from the lower portion of the opposite side of said chamber; a horizontal shaft coaxially rotatably mounted in said chamber and extending through the rear of said housing; a first downwardly inclined radially extending admission plate having one of its ends pivotally connected to said shaft and having its intermediate portion normally disposed above and covering the entrance to said first chute; a second downwardly inclined radially extending admission plate having one of its ends pivotally connected to said shaft and having its intermediate portion disposed above and covering the entrance to said second chute; an inverted V-shaped mounting element rigidly secured to and depending from said shaft, each leg of said element being formed with a bore; a pair of threaded posts each pivotally secured at one end to the underside of one of said admission plates and having its intermediate portion slidably disposed in one of said bores so that axial movement of said posts relative to said bores will change the relative angular displacement between said adjusting plates; nut means threadedly carried by said posts to effect axial adjustment of said posts relative to said mounting element; a radially extending divider plate having one of its ends rigidly connected to said shaft and normally being vertically positioned within said chamber so as to permit feed to enter either side of said chamber from said compartment; a strip of rubber-like material secured to the free end of said divider plate for engagement with the side walls of said chamber; spring detent means interposed between said divider plate and said housing for yieldably retaining said divider plate in its normal position; and handle means on the rear of said housing connected to said shaft so as to permit said shaft to be selectively rotated in a first direction whereby the free end of said first admission plate will move downwardly past the entrance to said first chute and the free end of said divider plate will move downwardly within said chamber so as to block off communication between one side of said chamber and said compartment in order that the feed so entering said one side of said chamber may pass through said first chute, and then in the opposite direction whereby the free end of said second admission plate will move downwardly past the entrance to said second chute and the free end of said divider plate will move downwardy within said chamber so as to block off communication between the other side of said chamber and said compartment in order that the feed so entering said other side of said chamber may pass through said second chute.

6. Animal feeding apparatus as set forth in claim 1 wherein a strip of rubber-like material is secured to the free end of said divider plate for engagement with the side walls of said metering chamber.

7. Animal feeding apparatus as set forth in claim 1 which includes resilient means interposed between said divider plate and the walls of said metering chamber for yieldably retaining said divider plate in its normal position.

8. Animal feeding apparatus as set forth in claim 1 which includes a strip of rubber-like material secured to the free end of said divider plate for engagement with the side walls of said metering chamber, and spring detent means interposed between said divider plate and the walls of said metering chamber for yieldably retaining said divider plate in its normal position.

References Cited in the file of this patent
UNITED STATES PATENTS

| | | |
|---|---|---|
| 506,552 | Sample | Oct. 10, 1893 |
| 789,085 | Dary | May 2, 1905 |